May 8, 1934.  C. B. HAMILTON, JR  1,957,832
SPEED REDUCING GEARING
Filed Jan. 29, 1932
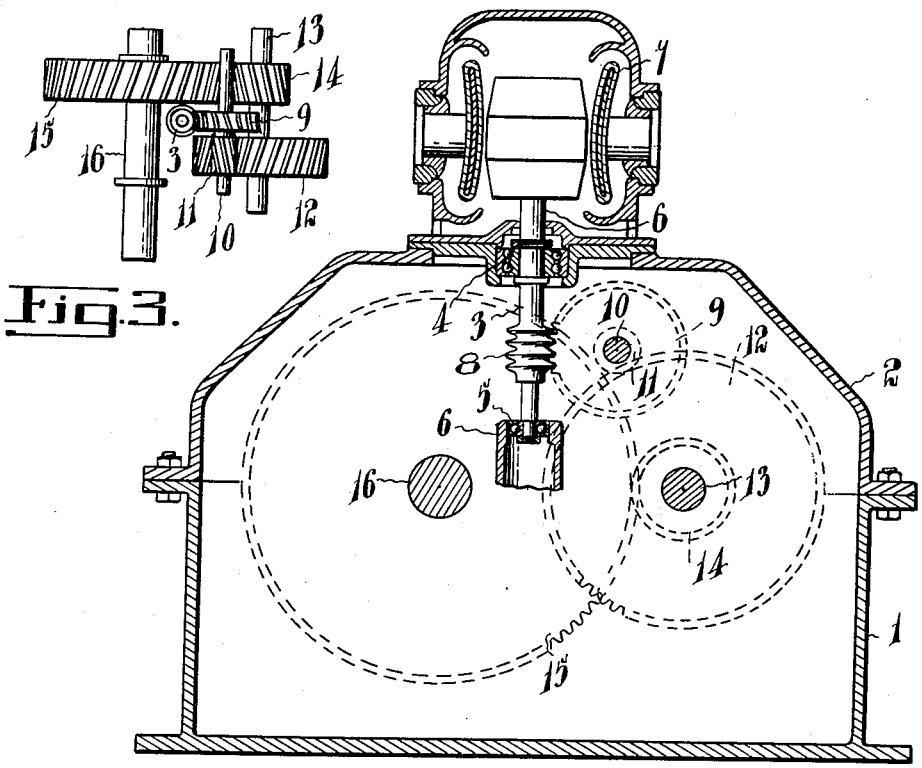
Fig. 3.
Fig. 1.
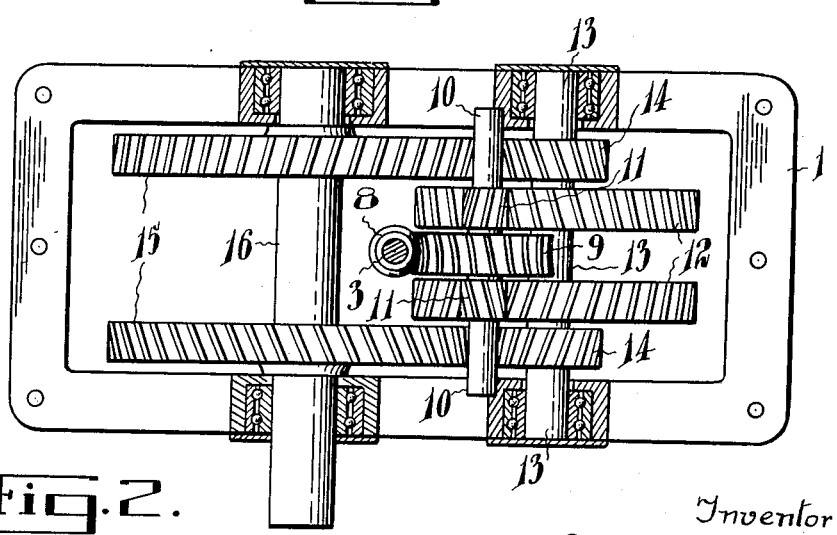
Fig. 2.
Inventor
C. B. Hamilton Jr
by J. Edw. Maybee
ATTY.

Patented May 8, 1934

1,957,832

UNITED STATES PATENT OFFICE 1,957,832

SPEED REDUCING GEARING

Chester B. Hamilton, Jr., Toronto, Ontario, Canada

Application January 29, 1932, Serial No. 589,617

13 Claims. (Cl. 74—7)

This invention relates to speed reduction gearing, and my main object is to devise gearing which is particularly adapted for use with high speed electric motors and where high ratios of reduction are required to slow speed final shafts, and incidental objects are to devise gearing which will have high mechanical efficiency, symmetrically arranged and evenly balanced and as a consequence will be subject to a minimum of strain and vibration, which is readily accessible for inspection or removal or lubrication, which will be very compact, and which will follow good machine design practice.

I attain my objects by arranging the axis of the main drive shaft at a right angle to the final driven shaft, and arranging the final driven shaft and intermediate shafts on opposite sides of the main drive shaft, and by providing a pair of trains of gearing, the trains being also arranged at opposite sides of the main drive shaft. The construction is hereinafter more specifically described and illustrated in the accompanying specification and drawing in which Fig. 1 is a vertical section through the improved gearing;

Fig. 2 a plan view of the gearing with the cover and motor removed, the bearings being shown in section; and Fig. 3 a plan view of a modified form of gearing.

In the drawing like numerals of reference indicate corresponding parts in the different figures.

1 is a supporting frame, preferably formed as a housing and provided with a cover 2, the meeting edges of the housing and cover being flanged and bolted together.

3 is the main drive shaft, preferably vertically arranged centrally of the housing or gear case and having its upper end journalled in a bearing 4 in the cover 2, and its lower end journalled in a bearing 5 carried by a support 6, preferably formed integral with the housing 1. The drive shaft 3 may be integral with or a separate extension of the drive shaft 6 of an electric motor 7, which is mounted on the outside of the cover 2.

On the shaft 3 is formed or secured a worm 8, which meshes with a worm gear 9 keyed on a shaft 10 journalled in the cover 2. On this shaft 10 are also mounted a pair of pinions 11, one at each side of the gear 9 and rotatable therewith. These pinions 11 in turn mesh respectively with a pair of gears 12 mounted on a shaft 13 journalled in the housing 1. At the outer side of each gear 12 and on the same shaft 13 is arranged a pinion 14, which pinions 14 mesh with gears 15 mounted on the final driven shaft 16 journalled in bearings formed in the side walls of the housing 1.

As far as the actual drive is concerned, it will be apparent that one of the pinions 11, one of the gears 12, one of the pinions 14 and one of the gears 15 could be dispensed with, one of each forming a train, but I prefer to use two trains so that weights and stresses will be substantially equal and balanced at each side of the worm 8 in a direction crosswise of the housing. It will be noticed, that the shafts 10 and 13 and the smaller gears and pinions are arranged towards one end of the housing, while the shaft 16 and the larger gears 15 are arranged towards the opposite end of the housing, so that the weight lengthwise of the housing will be substantially evenly balanced at opposite sides of the worm 8.

It will be seen that a satisfactory gearing is thus obtained without any of the complications of the use of a planetary arrangement of gears and without the use of internal gears. There are no overhung gears or pinions and no overhung loads of any kind. The motor or drive shaft, while overhung, in a sense, is vertical and not subject to side loads even of gravity. Every load is carried symmetrically between two bearings, which are preferably of an antifriction type. The gears employed are all preferably of the helical type, giving gradual engagement and consequent smooth operation. The primary or highest speed pair is preferably of the worm type which is most efficient at high speeds.

The rotor of the motor is preferably directly mounted on the worm or drive shaft 1, thus obviating the need for a shaft coupling or for motor bearings.

The motor, being preferably on the top of the gear case, is therefore substantially free from danger of oil splash or mechanical injury. There is no need for a bedplate such as is usually required with horizontally coupled motors to keep them in alinement with the gear case and there is also a considerable saving in the amount of floor space required.

In Fig. 3 a modified form of my invention is shown in which only one pinion 11 is mounted on the shaft 10, only one gear 12 and one pinion 14 on the shaft 13 and only one gear on the shaft 16. It will be noted, however that the arrangement is still sufficiently symmetrical and sufficiently well balanced for certain purposes where a cheaper speed reducing is required, part of the shafting being positioned at one side of the axis of the worm and part at the opposite side, while part of the gears and pinions is located at one side and part at the opposite side.

What I claim as my invention is:

1. In a speed changing gear drive, the combination of a driving worm; a worm gear; a shaft on which said worm gear is mounted; a final driven shaft paralleling the worm gear shaft; and a train of toothed gears forming the drive between said shafts, the axis of the worm being arranged in a direction at right angles to the axes of said shafts, said shafts being arranged one at one side of and the other at the opposite side of the axis of the worm, said train of gears also being arranged partly at one side and partly at the other side of the worm.

2. In a speed changing gear drive, the combination of a driving worm having its axis arranged substantially vertically; a worm gear; a horizontal shaft on which the worm gear is mounted; a final driven shaft paralleling the worm gear shaft; and a train of toothed gears forming the drive between said shafts, said shafts being arranged one at one side of and the other at the opposite side of the axis of the worm, said train of gears also being arranged partly at one side and partly at the other side of the worm.

3. In a speed changing gear drive, the combination of a driving worm; a worm gear; a plurality of shafts including an intermediate shaft on which said worm gear is mounted and a final driven shaft, one of said shafts being arranged at one side of said worm and one at the opposite side; and parallel trains of gears connecting said shafts, one train being arranged at one side of said worm and the other train at the opposite side.

4. In a speed changing gear drive, the combination of a driving worm; a worm gear; an intermediate shaft on which the worm gear is mounted; a pair of gear pinions on said shaft; a second intermediate shaft; a pair of gear wheels on said second shaft meshing with said pinions; a pair of pinions on said second shaft; a final driven shaft; and a pair of gears on said final driven shaft meshing with the pinions on the second shaft, the axis of the worm being arranged in a direction at right angles to the axes of the shafts.

5. In a speed changing gear drive, the combination of a driving worm; a worm gear; an intermediate shaft on which the worm gear is mounted; a pair of gear pinions on said shaft; a second intermediate shaft; a pair of gear wheels on said second shaft meshing with said pinions; a pair of pinions on said second shaft; a final driven shaft; and a pair of gears on said final driven shaft meshing with the pinions on the second shaft, the axis of the worm being arranged in a direction at right angles to the axes of the shafts, one of said shafts being arranged at one side of the worm and another shaft at the opposite side.

6. In a speed changing gear drive, the combination of a driving worm; a worm gear; an intermediate shaft on which the worm gear is mounted; a pair of gear pinions on said shaft; a second intermediate shaft; a pair of gear wheels on said second shaft meshing with said pinions; a pair of pinions on said second shaft; a final driven shaft; and a pair of gears on said final driven shaft meshing with the pinions on the second shaft, the axis of the worm being arranged in a direction at right angles to the axes of the shafts, said intermediate shafts being arranged at one side of the worm and the final driven shaft at the opposite side.

7. In a speed changing gear drive, the combination of a driving worm; a worm gear; an intermediate shaft on which the worm gear is mounted; a pair of gear pinions on said shaft; a second intermediate shaft; a pair of gear wheels on said second shaft meshing with said pinions; a pair of pinions on said second shaft; a final driven shaft; and a pair of gears on said final driven shaft meshing with the pinions on the second shaft, the axis of the worm being arranged in a direction at right angles to the axes of the shafts, one member of each pair of gears and each pair of pinions being arranged at one side of the worm and the other member of each such pair at the opposite side.

8. In a speed changing gear drive, the combination of a driving worm; a worm gear; an intermediate shaft on which the worm gear is mounted; a pair of gear pinions on said shaft; a second intermediate shaft; a pair of gear wheels on said second shaft meshing with said pinions; a pair of pinions on said second shaft; a final driven shaft; and a pair of gears on said final driven shaft meshing with the pinions on the second shaft, the axis of the worm being arranged in a direction at right angles to the axes of the shafts, one of said shafts being arranged at one side of the worm and another shaft at the opposite side, one member of each pair of gears and each pair of pinions being arranged at one side of the worm and the other member of each such pair at the opposite side.

9. In a speed changing gear drive, the combination of a driving worm; a worm gear; an intermediate shaft on which the worm gear is mounted; a pair of gear pinions on said shaft; a second intermediate shaft; a pair of gear wheels on said second shaft meshing with said pinions; a pair of pinions on said second shaft; a final driven shaft; and a pair of gears on said final driven shaft meshing with the pinions on the second shaft, the axis of the worm being arranged in a direction at right angles to the axes of the shafts, said intermediate shafts being arranged at one side of the worm and the final driven shaft at the opposite side, one member of each pair of gears and each pair of pinions being arranged at one side of the worm and the other member of each such pair at the opposite side.

10. In a speed changing gear drive, the combination of a driving worm; a worm gear; an intermediate shaft on which the worm gear is mounted; a gear pinion on said shaft; a second intermediate shaft; a gear wheel on said second shaft meshing with said pinion; a pinion on said second shaft; a final driven shaft; and a gear on said final driven shaft meshing with the pinion on the second shaft, the axis of the worm being arranged in a direction at right angles to the axes of the shafts, said intermediate shafts being arranged at one side of the worm and the final driven shaft at the opposite side.

11. In a speed changing gear drive, the combination of a driving worm; a worm gear; an intermediate shaft on which the worm gear is mounted; a gear pinion on said shaft; a second intermediate shaft; a gear wheel on said second shaft meshing with said pinion; a pinion on said second shaft; a final driven shaft; and a gear on said final driven shaft meshing with the pinion on the second shaft, the axis of the worm being arranged in a direction at right angles to the axes of the shafts, said shaft driving members being arranged partly at one side of the worm and partly at the opposite side.

12. In a speed changing gear drive, the combination of a driving worm; a worm gear; an intermediate shaft on which the worm gear is mounted; a gear pinion on said shaft; a second intermediate shaft; a gear wheel on said second shaft meshing with said pinion; a pinion on said second shaft; a final driven shaft; and a gear on said final driven shaft meshing with the pinion on the second shaft, the axis of the worm being arranged in a direction at right angles to the axes of the shafts, one of said shafts being arranged at one side of the worm and another shaft at the opposite side, said shaft driving members being arranged partly at one side of the worm and partly at the opposite side.

13. In a speed changing gear drive, the combination of a driving worm; a worm gear; an intermediate shaft on which the worm gear is mounted; a gear pinion on said shaft; a second intermediate shaft; a gear wheel on said second shaft meshing with said pinion; a pinion on said second shaft; a final driven shaft; and a gear on said final driven shaft meshing with the pinion on the second shaft, the axis of the worm being arranged in a direction at right angles to the axes of the shafts, said intermediate shafts being arranged at one side of the worm and the final driven shaft at the opposite side, said shaft driving members being arranged partly at one side of the worm and partly at the opposite side.

CHESTER B. HAMILTON, Jr.